United States Patent
Sytsma

(10) Patent No.: US 6,361,050 B1
(45) Date of Patent: Mar. 26, 2002

(54) OPPOSITELY ANGLED PISTON RING GROOVES

(75) Inventor: Steven J. Sytsma, Muskegon, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/417,717

(22) Filed: Oct. 14, 1999

(51) Int. Cl.[7] .................. B60T 11/236; F02F 5/00; F16J 9/00
(52) U.S. Cl. .................. 277/434; 277/452; 277/453; 277/454
(58) Field of Search .................. 277/434, 452, 277/453, 454

(56) References Cited

U.S. PATENT DOCUMENTS

| | | |
|---|---|---|
| 1,263,850 A | 4/1918 | Cain |
| 1,368,447 A | 2/1921 | Megson |
| 1,534,386 A | 4/1925 | Heslewood |
| 1,534,766 A | 4/1925 | Briney |
| 1,819,582 A | 4/1931 | Williams |
| 1,862,983 A * | 6/1932 | Roberts ............... 277/447 |
| 2,292,042 A | 8/1942 | Bowers |
| 2,522,764 A | 9/1950 | Roberts |
| 3,237,953 A | 3/1966 | Lucas |
| 3,831,952 A * | 8/1974 | Geffroy ............... 277/171 |

* cited by examiner

*Primary Examiner*—Anthony Knight
*Assistant Examiner*—Matthew E. Rodgers
(74) *Attorney, Agent, or Firm*—Rader, Fishman & Grauer PLLC

(57) ABSTRACT

A piston is disclosed having both downwardly and upwardly inclined piston ring grooves, the grooves being angled less than approximately ten degrees with respect to a horizontally extending axis. In a preferred embodiment, the grooves are less than approximately three degrees in inclination and in a most preferred embodiment, the inclination is less than approximately one degree. The grooves for the combustion seal are angled upwardly from an outer diameter of the piston to adjust for thermal drooping of the piston rings received within the grooves. The grooves for the oil-control seal are angled downwardly so that oil is scraped downwardly, but the oil control ring hydroplanes over the oil when the piston moves upwardly.

18 Claims, 1 Drawing Sheet

OPPOSITELY ANGLED PISTON RING GROOVES

FIELD OF THE INVENTION

The present invention relates to a piston having at least two piston ring grooves for a piston, an upper groove angled slightly upwardly when viewed from an inner periphery of the ring toward the outer periphery and a lower groove angled slightly downwardly.

BACKGROUND OF THE INVENTION

Piston rings are usually received within an annular groove disposed about an outer periphery of a piston used within an internal combustion engine. In turn, the piston is reciprocated within a cylinder of an internal combustion engine. Typically, the piston ring is discontinuous, having two end portions. The end portions are separated from one another to expand the piston ring for insertion into a corresponding groove of the piston. The piston ring is then compressed, bringing the end portions closer together, to install the piston within the cylinder.

A piston compresses fluids such as gases within the cylinder. In an internal combustion engine these fluids are ignited and expand, forcing the piston away from the point of ignition. The outer surface or bearing face of a piston ring in an internal combustion engine is subjected to high temperatures, corrosion, and frictional interaction with the walls of the cylinder.

Typically, the uppermost piston ring acts as a combustion seal, keeping the gases of combustion from escaping away from the combustion chamber. In contrast, the lowermost piston ring acts as an oil control ring, preventing oil from escaping into the combustion chamber.

Piston rings acting as combustion seals typically are formed from a single strip of wire formed into a circle with two opposing ends. They are then given a protective wear resistant coating. Finally, the rings are subjected to cutoff and lapping operations to give final surface finish and geometry of form. It is difficult to ensure that a ring contacts all the way around the mating surface of the cylinder wall, let alone further modifying the ring to provide enhanced operational properties. For example, rings arc known having directional characteristics wherein combustion gases are supposedly subject to improved retention within the combustion chamber as the piston and its retained combustion seal move upwardly during the combustion stroke. However, the alleged advantage of such directional characteristics within the combustion seal is compromised when the piston ring is installed upside down.

Piston ring grooves adapted to receive piston rings acting as combustion seals are known that have an upward tilt as viewed from the inner periphery of the piston toward the outer periphery. However, the art teaches that the tilt must be substantial, on the order of tens of degrees. Moreover, the rings themselves must have a corresponding tilt. For example, in U.S. Pat. No. 2,522,764, the upper and lower walls of the groove and the corresponding surfaces of the ring have an angle of approximately sixty-five degrees (65°) with the direction of the axis of the piston and, likewise, with the inner face of the cylinder wall. In U.S. Pat. No. 2,292,042, a similar inclination is illustrated.

The rationale for having such a substantial upward tilt in the prior art relates to the belief that if a piston ring is substantially inclined upwardly toward the axis of the piston, more force will be required to force the ring to be expanded against the cylinder wall than if the piston ring were supported horizontally in the piston groove. Thus, wear on the cylinder wall is reduced, and particularly wear resulting from gas pressure fluctuation resulting from the combustion process. The disadvantage of such an approach, however, is that while wear is decreased, the passage of unwanted combustion gases past the combustion seal is increased.

Piston ring grooves adapted to receive piston rings acting as combustion seals are also known that have a downward tilt as viewed from the inner periphery of the piston toward the outer periphery. However, the art teaches that the tilt must once again be substantial, on the order of tens of degrees. Moreover, the rings themselves must have a corresponding tilt. For example, in U.S. Pat. No. 3,237,953, the upper and lower walls of the groove and the corresponding surfaces of the ring have an angle from forty-five to eighty-eight degrees (44 to 88°) with the vertical face of the cylinder in which the ring and piston reciprocate. In U.S. Pat. No. 1,263,850, a similar inclination is illustrated.

The rationale for having such a substantial downward tilt in the prior art relates to the belief that the inclination tends to cause the ring to snugly press against the cylinder wall on an upward combustion stroke.

Piston rings acting as oil control seals are typically formed from a combination of elements, namely upper and lower rails separated by an expander. In the prior art, they are disposed in the lowermost groove of the piston, the groove having the same angular nature as the combustion seal grooves that are disposed above it.

Therefore, there is no consideration of the disadvantage of having grooves with differing angular tilt or inclination depending on the desired function of the piston ring associated with that groove. Instead, a single gang tool holder and tool path is used to reduce cost and simplify the groove making operation.

SUMMARY OF THE INVENTION

An inventive piston assembly includes a piston having a plurality of annular grooves extending inwardly from an outer periphery. The grooves are adapted to receive mating piston rings. The uppermost groove associated with a piston ring acting as a combustion seal has an angled tilt or inclination in a first direction while the lowermost groove associated with a piston ring acting as an oil control seal has an angled tilt or inclination in the opposite direction.

In a preferred embodiment, the angle of inclination for the uppermost groove is upward as viewed from the inner periphery of the piston toward the outer periphery and adjusts for thermal droop of the piston ring received within the groove. The angle of inclination is less than approximately ten degrees (10°), more preferably less than approximately three degrees (3°), and most preferably less than approximately a degree (1°). It may be as little as one-tenth of a degree. The piston ring is preferably non-directional in its bias so that it may be installed without concern that the ring may be upside down. Moreover, an intermediate combustion seal comprising a groove and a piston ring may be disposed between the uppermost groove and the lowermost groove. The intermediate groove has the same angle of inclination as the uppermost groove and is formed using the same forming operation as for the uppermost groove.

The angle of inclination of the groove receiving a piston ring, and collectively acting as an oil control seal, is downward as viewed from the inner diameter of the piston toward the outer diameter. As with the uppermost groove, the angle of inclination of the lowermost groove is in the same preferred ranges. However, in practice, the angle of inclination of the lowermost groove will generally be greater than that of the uppermost groove. The piston ring received in the lowermost groove is typically a three-piece ring comprising an expander with upper and lower rails. The oil control seal is designed to scrape oil from the cylinder wall on the downward stroke of the piston and to hydroplane over the oil on the upward stroke of the piston so as to avoid oil movement toward the combustion chamber.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF A PREFERRED EMBODIMENT

Figure 1:
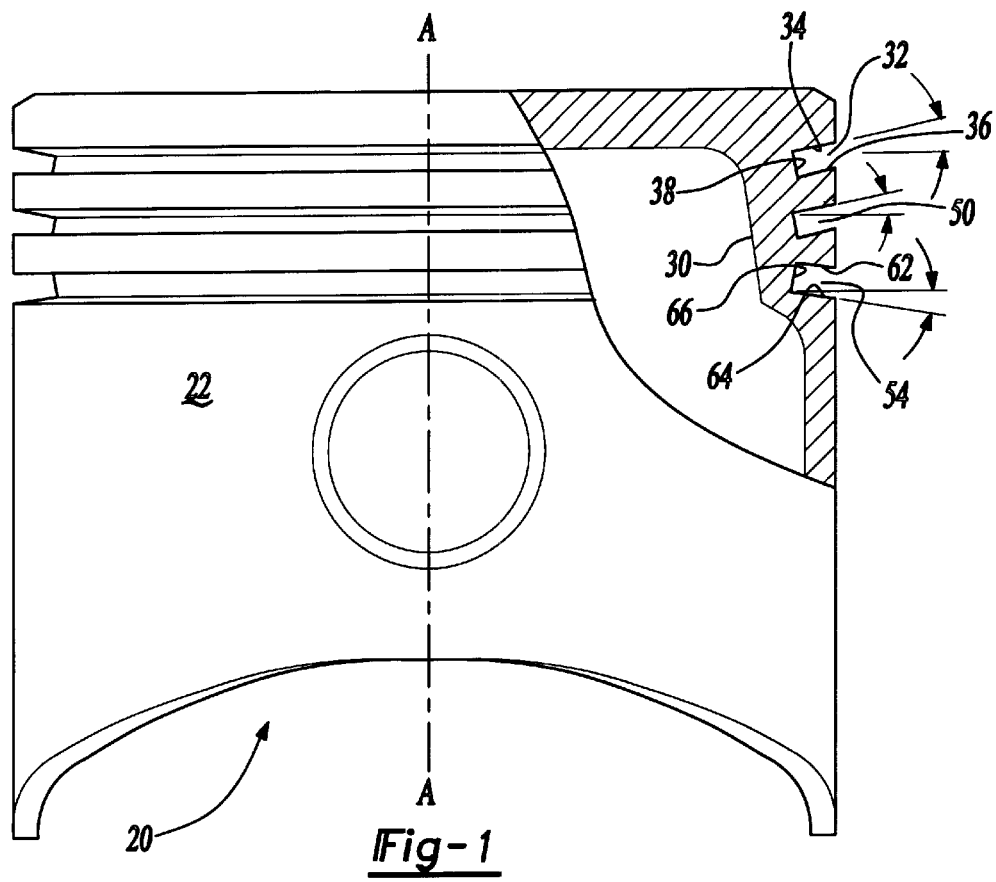
FIG. 1 is a cross-sectional view of an inventive piston according to the present invention.
Figure 2:
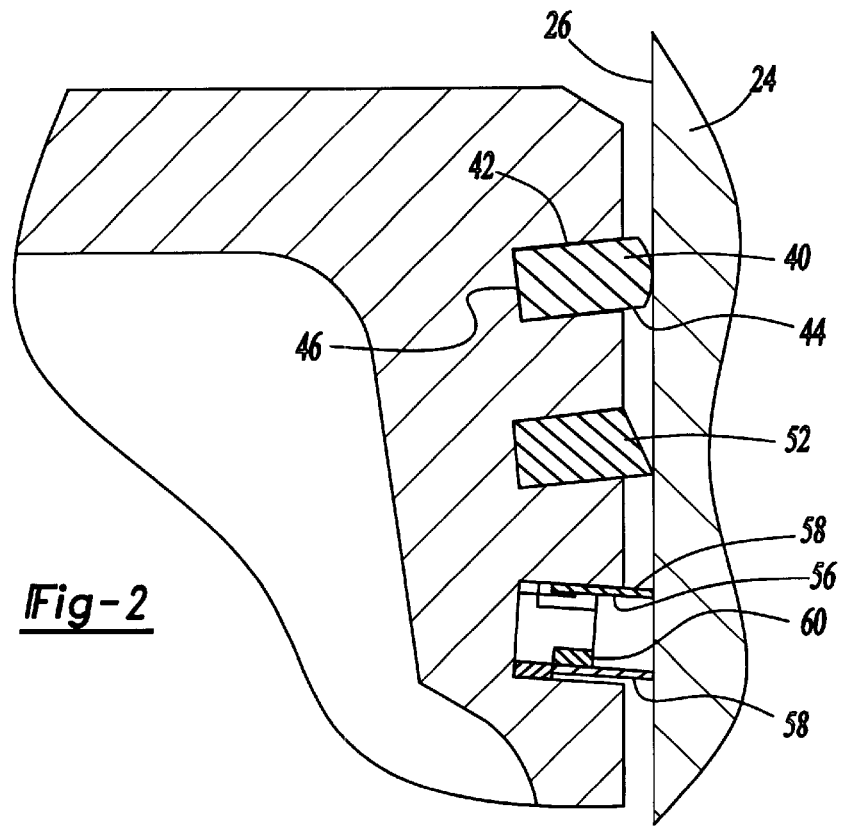
FIG. 2 is an enlarged view of a portion of the piston of FIG. 1 showing the inclination of the piston ring grooves in greater detail.

A piston assembly 20 is illustrated in FIGS. 1 and 2 that includes a piston 22 reciprocable along a longitudinally axis A—A within a bore of cylinder 24 of an internal combustion engine adjacent cylinder walls 26. Piston 22 has an outer diameter 28 defining an outer periphery and an inner diameter 30 defining an inner periphery of the piston.

Piston 22 includes a plurality of annular grooves extending radially inwardly from the outer diameter 28 that are adapted to receive piston rings. An uppermost combustion seal groove 32 is closest to the combustion chamber of the engine (not shown). It has an upward tilt viewed from the inner diameter 30 toward outer diameter 28. More specifically, both an upper wall 34 and a lower wall 36 are parallel to each other and angled the same amount with respect an axis perpendicular to axis A—A. An inner wall 38 of groove 32 is preferably perpendicular to walls 34 and 36 and angled with respect to axis A—A.

Groove 32 is adapted to receive a typical piston ring 40 known in the art. Ring 40 is preferably made from a single piece of metal and subjected to normal wear coating mechanisms. It includes opposing surfaces 42 and 44 and an inner diameter 46 adapted to selectively contact wall 38. Typically, ring 40 includes a slight crown on its outer diameter. In a preferred embodiment, ring 40 has no directional characteristics, meaning it can be installed such that either of surfaces 42 or 44 may selectively contact upper wall 34.

Unlike the prior art, ring 40 preferably does not have an angle of tilt adapted to match that of mating groove 32. Instead, opposing surfaces 42 and 44 are generally perpendicular to inner diameter 46. Moreover, unlike the prior art, the angle of tilt of groove 32 is less than ten degrees (10°), and preferably less than three degrees (3°). In a most preferred embodiment, the angle of tilt is less than approximately one degree (1°). In practice, the angle of tilt may be on the order of as little as one-tenth of a degree. The key purpose of having groove 32 slightly angled is to adapt for thermal droop of ring 40 as it heats from an ambient temperature to an operational temperature. Thus, in an operational orientation, the slight angled tilt of groove 32 adjusts for the thermal droop so that ring 40 engages cylinder wall 26 in a generally horizontal manner. Thus, ring 40, in combination with the slight adjustment provided by groove 32, is able to provide maximum combustion sealing protection to piston 22 in engagement with cylinder wall 26. The sealing protection is provided without the undesirable wear resulting from gas pressure fluctuation when ring 40 is angled either downwardly or upwardly at an undesirable angle of tilt.

Piston 22 includes an intermediate piston groove 50. Groove 50 preferably includes a secondary combustion seal in the form of piston ring 52. Piston ring 52 may be slightly different then piston ring 32. For example, ring 52 may be generally rectangular with a taper face for scraping oil downward and with an inside diameter bottom side chamfer. However, groove 50 and ring 52 are configured in the same fashion as with groove 32 and ring 40 to adopt for thermal drooping. Preferably, groove 50 even includes the same angle of inclination so that it can be formed at the same time as groove 32 in the same plunging operation using a single gang tool and tool path.

A lowermost groove 54 is also illustrated in the figures. In contrast to grooves 32 and 50, groove 54 is adapted to receive an oil control ring 56 that is comprised of upper and lower rails 58 with an intermediate expander 60 disposed between them. Ring 56 is preferably non-directional in its configuration.

In contrast to grooves 32 and 50, however, groove 54 preferably has a downward tilt viewed from the diameter diameter 30 toward outer diameter 28. More specifically, both an upper wall 62 and a lower wall 64 are parallel to each other and angled the same amount with respect to an axis perpendicular to axis A—A. An inner wall 66 is preferably perpendicular to walls 62 and 64 and angled with respect to axis A—A.

While groove 54 has a downward tilt, the angle of tilt is less than ten degrees (10°), and preferably less than three degrees (3°). It may even have an angle of tilt less than approximately one degree (1°). However, in general, the downward angle of tilt for groove 54 is greater than the upward angle of tilt for the combustion seal grooves 32 and 50.

Oil control ring 56 and groove 54 work in combination to scrape oil from cylinder wall 26 on the upward stroke of piston 22 so that oil is prohibited from entering the combustion chamber. However, it is preferred that limited oil scraping, if any, take place on the upward piston stroke so that oil flow into the combustion chamber is minimized. Therefore, the angle of groove 54 is selected to be in the hydrodynamic realm such that while scraping takes place on the downward piston stroke, ring 56 hydroplanes over the oil on the upward stroke.

Thus, while piston ring grooves are known in the prior art that have either a downward or an upward angular inclination, the simultaneous use of downward and upwardly tilting grooves for the same piston is not known. Moreover, while the grooves are tilted, the degree of tilt is substantially less than that taught in the prior art. Thus, in accordance with the present invention, the combustion seals provide maximum sealing without undue wear as a result of pressure changes during the combustion process while the oil control seal only scrapes oil on the downward stroke of the piston, riding over the oil on the upward stroke.

What is claimed is:

1. A piston having an outer diameter and an inner diameter comprising:

a first piston ring groove having an upper and lower wall, said upper and lower wall each having an upwardly extending tilt viewed from said inner diameter toward said outer diameter;

a second piston ring groove having an upper and lower wall, said upper and lower wall each having a downwardly extending tilt viewed from said inner diameter toward said outer diameter; and piston rings having non-directional characteristics received in said grooves.

2. A piston as recited in claim 1, wherein each of said tilts is less than ten degrees.

3. A piston as recited in claim 2, wherein each of said tilts is less than three degrees.

4. A piston as recited in c claim 3, wherein said tilt of said first piston ring groove is less than said tilt of said second piston ring groove.

5. A piston as recite d in claim 4, wherein said tilt of said first piston ring groove is no more than approximately one degree.

6. A piston as recited in claim 1, wherein said first groove is the uppermost groove of said piston.

7. A piston as recited in claim 6, wherein said second groove is the lowermost groove of said piston.

8. A piston for use in an internal combustion engine having an outer diameter and an inner diameter, comprising:

an uppermost groove having an upper and lower wall, said upper and lower wall each having an angled tilt in a first direction;

a lowermost groove having an upper and lower wall, said upper and lower wall each having an angled tilt in a second direction opposing said first direction; and piston rings having non-directional characteristics received in said grooves.

9. A piston as recited in claim 8, wherein said first direction is upward and said second direction is downward.

10. A piston as recited in claim 8, wherein each of said angled tilts is less than ten degrees.

11. A piston as recited in claim 10, wherein said angled tilt of said uppermost groove is less than approximately one degree.

12. A piston as recited in claim 11, wherein said angled tilt of said lowermost groove is greater than said angled tilt of said uppermost groove.

13. A piston as recited in claim 8, wherein said piston rings have first and second opposing surfaces generally perpendicular to inner and outer diameters of each said ring, such that each said ring may be installed in a corresponding groove of said piston with either of said first and second opposing surfaces acting as said upper surface.

14. A piston as recited in claim 13, wherein said piston rings lack said angled tilt of said corresponding groove in an ambient condition.

15. A piston having an outer diameter and an inner diameter, comprising:

an uppermost piston ring groove having upper and lower walls with a common upward angled tilt of less than ten degrees;

a lowermost piston ring groove having upper and lower walls with a common downward angled tilt of less than ten degrees; and piston rings having non-directional characteristics received in said grooves, wherein said piston rings have first and second opposing surfaces generally perpendicular to inner and outer diameters of said ring.

16. A piston as recited in claim 15, wherein said upward angled tilt is less than approximately one degree.

17. A piston as recited in claims 15, wherein said piston rings lack said angled tilt of said corresponding groove in an ambient condition.

18. A piston as recited in claim 15, wherein said upper and lower walls of each said groove are parallel to one another.

* * * * *

UNITED STATES PATENT AND TRADEMARK OFFICE
CERTIFICATE OF CORRECTION

PATENT NO.    : 6,361,050 B1
DATED         : March 26, 2002
INVENTOR(S)   : Steven J. Sytsma It is certified that error appears in the above-identified patent and that said Letters Patent is hereby corrected as shown below:

<u>Column 5,</u>
Line 13, replace "c" with -- --.
Line 16, replace "recite d" with -- recited --.

<u>Column 6,</u>
Line 31, replace "claims" with -- claim --.

Signed and Sealed this

Third Day of September, 2002

Attest:

JAMES E. ROGAN
Attesting Officer          *Director of the United States Patent and Trademark Office*